United States Patent
Furukawa

(10) Patent No.: US 8,261,115 B2
(45) Date of Patent: Sep. 4, 2012

(54) SUB-PROCESSOR CONFIGURED TO EXECUTE A SPECIFIC PROGRAM STORED IN THE FIRST MEMORY OR SECOND MEMORY ON BEHALF OF THE MAIN PROCESSOR

(75) Inventor: Akihiro Furukawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 337 days.

(21) Appl. No.: 12/728,545

(22) Filed: Mar. 22, 2010

(65) Prior Publication Data

US 2010/0250987 A1 Sep. 30, 2010

(30) Foreign Application Priority Data

Mar. 26, 2009 (JP) ................................ 2009-077507

(51) Int. Cl.
*G06F 1/26* (2006.01)
*G06F 1/32* (2006.01)

(52) U.S. Cl. ........ 713/320; 713/300; 713/322; 713/323; 713/324

(58) Field of Classification Search .................. 713/300, 713/320, 322, 323, 324
See application file for complete search history.

(56) References Cited

U.S. PATENT DOCUMENTS

| | | | |
|---|---|---|---|
| 5,742,833 A | 4/1998 | Dea et al. | |
| 5,913,068 A * | 6/1999 | Matoba | 713/322 |
| 7,197,627 B1 * | 3/2007 | Naylor | 712/34 |
| 7,502,817 B2 * | 3/2009 | Ryan | 709/200 |
| 2002/0095609 A1 * | 7/2002 | Tokunaga | 713/300 |
| 2005/0021728 A1 | 1/2005 | Sugimoto | |
| 2006/0129861 A1 * | 6/2006 | Kee et al. | 713/323 |
| 2007/0226522 A1 * | 9/2007 | Aleksic et al. | 713/300 |
| 2008/0028245 A1 * | 1/2008 | Ober et al. | 713/324 |
| 2008/0104429 A1 * | 5/2008 | Horvath | 713/300 |

(Continued)

FOREIGN PATENT DOCUMENTS

JP 09-160882 6/1997

(Continued)

*Primary Examiner* — Vincent Tran
(74) *Attorney, Agent, or Firm* — Banner & Witcoff, Ltd.

(57) ABSTRACT

A processing device may comprise a first controlling unit, a second controlling unit, a first memory and a second memory. The second memory may be set to a normal operation mode in a case where the first controlling unit is in the non-sleeping state, and may be set to a low power consumption mode in a case where the first controlling unit is in the sleeping state. In the case where the first controlling unit is in the sleeping state, the second controlling unit may be configured to perform one of the below processes depending on its condition. If the second controlling unit is to perform a specific process by using a first program, the second controlling unit may perform the specific process on behalf of the first controlling unit by using the first program stored in the first memory while the first controlling unit is maintained in the sleeping state and the second memory is maintained in the low power consumption mode. If the second controlling unit is to perform the specific process by using a second program, the second controlling unit may change a mode of the second memory from the low power consumption mode to the normal operation mode, and perform the specific process on behalf of the first controlling unit by using the second program stored in the second memory, while the first controlling unit is maintained in the sleeping state.

11 Claims, 11 Drawing Sheets

U.S. PATENT DOCUMENTS

2009/0106572 A1* 4/2009 Taguchi et al. ............... 713/322

FOREIGN PATENT DOCUMENTS

| | | |
|---|---|---|
| JP | 2001-257688 | 9/2001 |
| JP | 2003-108273 | 4/2003 |
| JP | 2004-005029 | 1/2004 |
| JP | 2005-041127 | 2/2005 |
| JP | 2007-088707 | 4/2007 |

* cited by examiner

FIG. 3

Proxy Response Process Administration Table 60

| | Protocol | ARP | Net BIOS-NS | SNMP | ICMP | SSDP | mDNS | |
|---|---|---|---|---|---|---|---|---|
| 72 | RAM | First RAM | First RAM | Second RAM | First RAM | First RAM | First RAM | ... |
| 74 | Source-Address for Reading | — | — | — | Address in Second RAM | Address in Second RAM | Address in Second RAM | ... |
| 76 | Performable Flag | Performable at Anytime | Performable at Anytime | Performable at Anytime | Unperformable | Performable | Performable | ... |
| 78 | Performing Address | Address in First RAM | Address in First RAM | Address in Second RAM | — | Address in First RAM | Address in First RAM | ... |
| 80 | Number of Use | — | — | — | 0 | 1 | 2 | ... |

First RAM Dedicated Program: ARP, Net BIOS-NS
Second RAM Dedicated Program: SNMP
Loadable Program: ICMP, SSDP, mDNS

| | Main CPU | Sub CPU | First RAM | Second RAM | Display Panel |
|---|---|---|---|---|---|
| 92 — Processing State | Clock Supplied | Clock Supplied | Normal Operation Mode | Normal Operation Mode | ON |
| 94 — Standby State | Clock Supplied | Clock Supplied | Normal Operation Mode | Normal Operation Mode | ON |
| 96 — L-sleeping State | Clock Supplied | Clock Supplied | Normal Operation Mode | Normal Operation Mode | OFF |
| 98 — D-sleeping State | Clock Stopped | Clock Supplied | Normal Operation Mode | Self Refresh Mode | OFF |

SUB-PROCESSOR CONFIGURED TO EXECUTE A SPECIFIC PROGRAM STORED IN THE FIRST MEMORY OR SECOND MEMORY ON BEHALF OF THE MAIN PROCESSOR

CROSS-REFERENCE TO RELAYED APPLICATIONS

This application claims priority to Japanese Patent Application No. 2009-077507, filed on Mar. 26, 2009, the contents of which are hereby incorporated by reference into the present application.

TECHNICAL FIELD

The present specification discloses a processing device to perform a specific process by using a program stored in a memory.

DESCRIPTION OF RELATED ART

There is a known technology for shifting a controlling unit from a non-sleeping state to a sleeping state having less power consumption than the non-sleeping state, in a case where a processing device does not perform a process for a predetermined amount of time.

SUMMARY

A processing device with lower power consumption is required. In a conventional technology, the power consumption of a memory is not given enough consideration. The present specification provides a technology capable of saving power of the memory.

The technology disclosed by the present specification relates to a processing device. This processing device may comprise a first controlling unit, a second controlling unit, a first memory and a second memory. The first controlling unit may be configured to transit between a sleeping state and a non-sleeping state, and perform a specific process in a case where the first controlling unit is in the non-sleeping state. The second controlling unit may be configured to perform the specific process on behalf of the first controlling unit in a case where the first controlling unit is in the sleeping state. The first memory may be configured to store a first program. The second memory may be configured to store a second program. The second memory may be set to a normal operation mode in the case where the first controlling unit is in the non-sleeping state, and the second memory may be set to a low power consumption mode in the case where the first controlling unit is in the sleeping state. In the case where the first controlling unit is in the sleeping state, the second controlling unit may be configured to perform one of the below processes depending on its condition. If the second controlling unit is to perform the specific process by using the first program, the second controlling unit may perform the specific process on behalf of the first controlling unit by using the first program stored in the first memory while the first controlling unit is maintained in the sleeping state and the second memory is maintained in the low power consumption mode. If the second controlling unit is to perform the specific process by using the second program, the second controlling unit may change a mode of the second memory from the low power consumption mode to the normal operation mode, and perform the specific process on behalf of the first controlling unit by using the second program stored in the second memory, while the first controlling unit is maintained in the sleeping state.

BRIEF DESCRIPTION OF THE DRAWINGS

FIG. 3 shows an example of a proxy response process administration table.
FIG. 6 shows an example of a state of each part corresponding to the state of the printer.

EMBODIMENT (Configuration of Printer)

Figure 1:
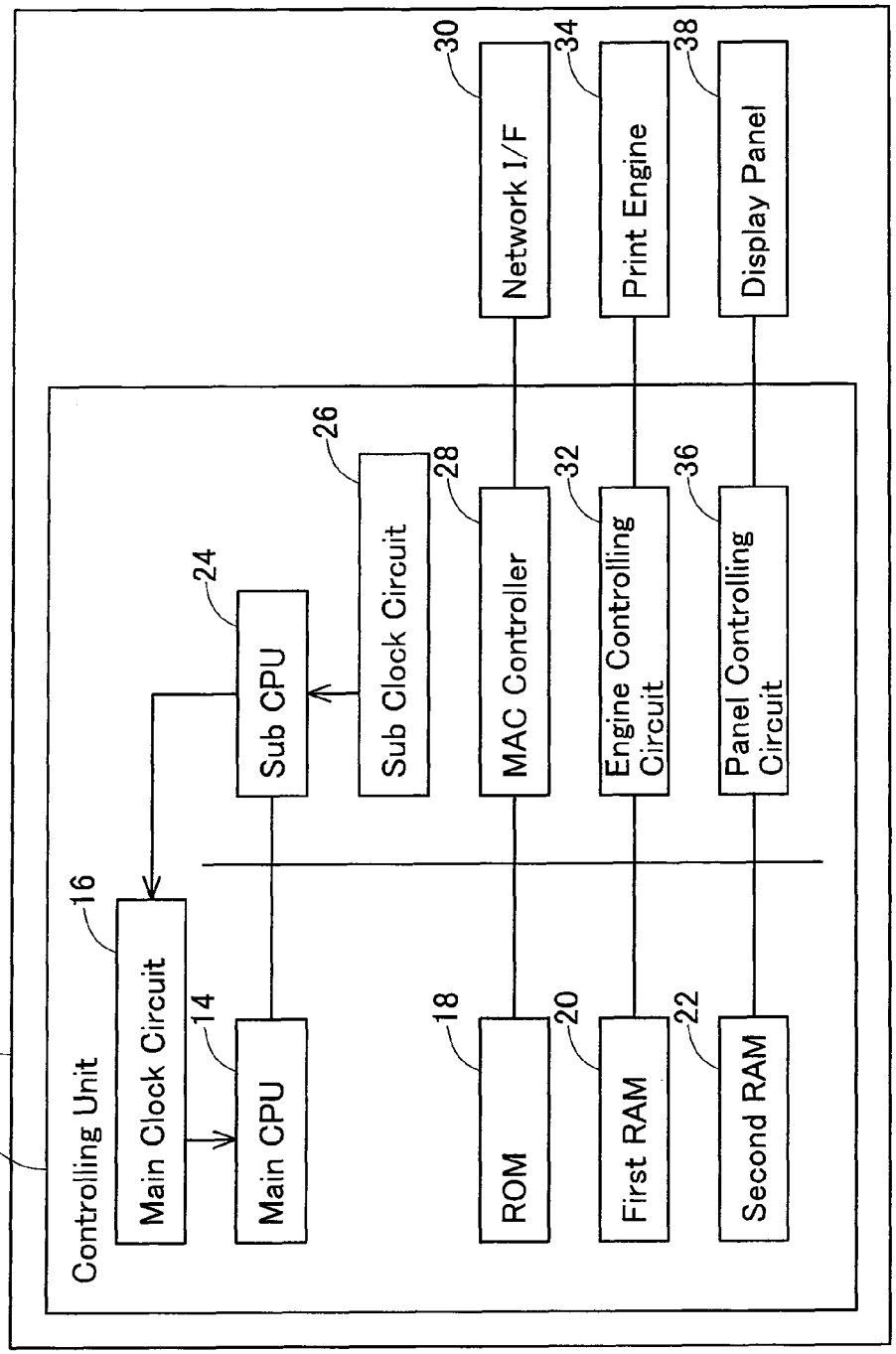
FIG. 1 shows a schematic configuration of a printer.

An embodiment is described with reference to the drawings. A printer 10 comprises a controlling unit 12, a network interface 30, a print engine 34, and a display panel 38. The controlling unit 12 comprises a main CPU 14, a main clock circuit 16, a ROM 18, two RAMs 20 and 22, a sub CPU 24, a sub clock circuit 26, a MAC controller 28, an engine controlling circuit 32, a panel controlling circuit 36, etc.

The main CPU 14 performs various processes according to a program stored in the second RAM 22. The main CPU 14 has a timer mechanism. Hereinafter, this timer is referred to as "standby state timer." The main clock circuit 16 supplies a clock signal to the main CPU 14. While the clock signal is supplied to the main CPU 14, the main CPU 14 is in a non-sleeping state. While the clock signal is not supplied to the main CPU 14, the main CPU 14 is in a sleeping state. Note that the main clock circuit 16 is controlled by the sub CPU 24.

The sub CPU 24 performs various processes according to programs stored in the first RAM 20 and the second RAM 22. The sub clock circuit 26 supplies a clock signal to the sub CPU 24. The frequency of the clock signal of the sub clock circuit 26 is lower than the frequency of the clock signal of the main clock circuit 16. Thus, the power consumed for driving the sub CPU 24 is lower than the power consumed for driving the main CPU 14. The sub clock circuit 26 supplies the clock signal to the sub CPU 24 when the power of the printer 10 is turned on (this is often referred as "the printer 10 is activated" hereinafter). When the power of the printer 10 is turned off, the sub clock circuit 26 stops supplying the clock signal to the sub CPU 24. That is, the sub CPU 24 is not set to a sleeping state but is maintained in the non-sleeping state while the printer 10 is activated.

A plurality of programs performed by the main CPU 14 and the sub CPU 24 are stored in the ROM 18. The plurality of programs has been compressed. Each of the programs is expanded in the first RAM 20 or the second RAM 22 when the printer 10 is activated. The main CPU 14 or sub CPU 24 uses the program expanded in the first RAM 20 or the second RAM 22, to perform the processes. All of the programs stored in the ROM 18 are expanded once in the second RAM 22. Then, predetermined programs out of the plurality of the programs expanded in the second RAM 22 are loaded into the first RAM 20. Although not shown, the controlling unit 12 further comprises a circuit for supplying clock signal to the second RAM 22.

Figure 2:
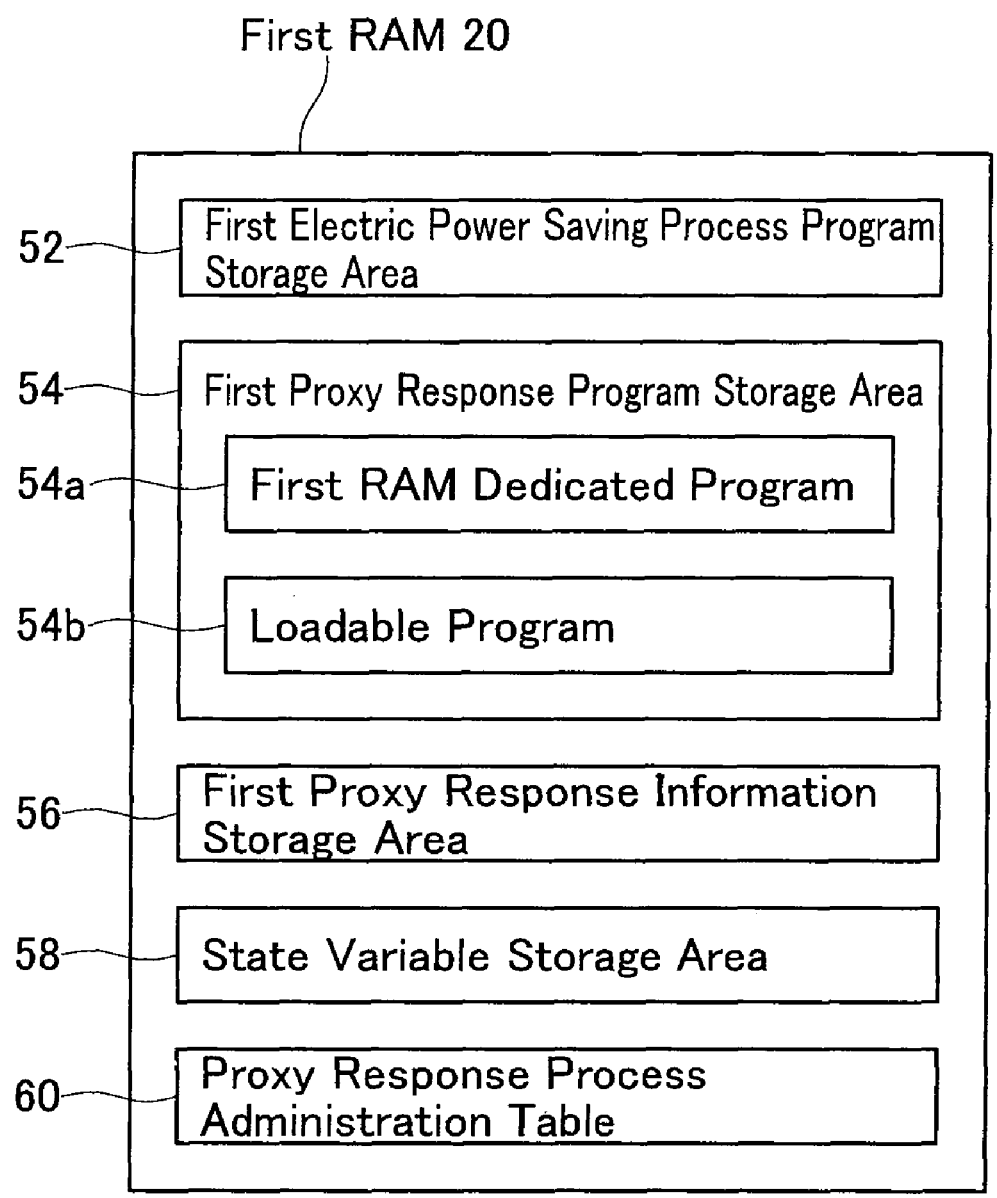
FIG. 2 shows an example of a memory area of a first RAM.

The first RAM 20 is an SRAM. FIG. 2 shows an example of a configuration of a storage area of the first RAM 20 (FIG. 1). The first RAM 20 comprises a first electric power saving process program storage area 52, a first proxy response program storage area 54, a first proxy response information storage area 56, a state variable storage area 58, and a proxy response process administration table 60.

A program used by the sub CPU 24 to perform an electric power saving process (see FIGS. 10 and 11) is stored in the first electric power saving process program storage area 52. The main CPU 14 loads and stores a sub CPU electric power saving process program out of the plurality of programs expanded in the second RAM 22, into the first electric power saving process program storage area 52.

The first proxy response program storage area 54 is an area for storing a program that the sub CPU 24 uses, as a proxy of (on behalf of) the main CPU 14, to perform the process. When the printer 10 is activated, the main CPU 14 loads and stores, in the first proxy response program storage area 54, a proxy response program (e.g., an ARP (Address Resolution Protocol) or NetBIOS-NS (Network Basic Input Output System-Name Service) shown in FIG. 3), which is designated previously e.g., by a designer, out of the plurality of programs expanded in the second RAM 22, into the first proxy response program. Hereinafter, the proxy response program that is stored in the first proxy response program storage area 54 at the time of the activation of the printer 10 is often called "first RAM dedicated program 54a." Note that, as described above, in the present embodiment, the main CPU 14 expands all of the programs stored in the ROM 18 in the second RAM 22, and then loads the predetermined program from the second RAM 22 into the first RAM 20. However, in another embodiment, the main CPU 14 may expand the predetermined program from the ROM 18 to the first RAM 20.

Information that is required by the sub CPU 24 to perform the process as the proxy of (on behalf of) the main CPU 14 is stored in the first proxy response information storage area 56. Examples of the information stored in the first proxy response information storage area 56 include an IP address, MAC address and node name of the printer 10.

State variable indicating the states of the printer 10 is stored in the state variable storage area 58. The printer 10 operates in any of "processing state," "standby state," "light sleeping state (L-sleeping state)," and "deep sleeping state (D-sleeping state)." Therefore, one of the four values corresponding to the four states is stored in the state variable storage area 58.

In the proxy response process administration table 60 shown in FIG. 3, columns 62, 64, 66, 67, 68 and 69 are set for respective protocols. In the present embodiment, although only the six columns 62, 64, 66, 67, 68 and 69 are shown, there are actually columns corresponding to other protocols. To each of the columns 62, 64, 66, 67, 68 and 69, a protocol 70, a storage RAM 72, a source address for reading 74, a performable flag 76, a performing address 78, and the number of use 80 are associated and recorded.

Identification information corresponding to the protocols used in a proxy response process is recorded in the protocol 70.

The type of a RAM for storing the program corresponding to the protocol used by the sub CPU 24 to perform the proxy response process is recorded in the RAM 72. In the present embodiment, either the first RAM 20 or the second RAM 22 is recorded. In a case where the type of the RAM 72 is the "first RAM," the program is used to perform the proxy response process while the program is stored in the first RAM 20. In a case where the type of the RAM 72 is the "second RAM," the program is used for performing the proxy response process while the program is stored in the second RAM 22. Note that the proxy response program that is used while being stored in the second RAM 22 is often called "second RAM dedicated program 88a." In the present embodiment, a proxy response program for a SNMP (Simple Network Management Protocol) is adopted as the second RAM dedicated program 88a.

Information (address information) of an address in the second RAM 22 where the program is stored is recorded in the source address for reading 74. Note in a case where the "second RAM" is recorded in the RAM 72 (that is, in a case where a proxy response program is the second RAM dedicated program 88a), the address information is not recorded in the source address for reading 74. Furthermore, in a case where "address within the first RAM" is recorded in the performing address 78 and in a case where a proxy response program is the first RAM dedicated program 54a, the address information is not recorded in the source address for reading 74. The address information is recorded in the source address for reading 74 in a case where a loadable program 86a mentioned below is recorded.

A flag indicating "Unperformable," "Performable" or "Performable at Anytime" is recorded in the performable flag 76. For example, the flag indicating "Performable at Anytime" is recorded in the performable flag 76 corresponding to the abovementioned first RAM dedicated program 54a (the proxy response program that is stored in the first proxy response program storage area 54 (see FIG. 2) of the first RAM 20 at the time of the activation of the printer 10). The flag indicating "Performable at Anytime" is also recorded in the performable flag 76 corresponding to the abovementioned second RAM dedicated program 88a (the proxy response program that is used while being stored in the second RAM 22). On the other hand, at the time of the activation of the printer 10, "Performable" or "Unperformable" is recorded in the performable flag 76 corresponding to the program that is not stored in the first RAM 20 but in the second RAM 22. As will be described hereinafter in detail, when performing the proxy response process, the sub CPU 24 performs a process of loading the proxy response program to be used in the proxy response process, from the second RAM 22 into the first proxy response program storage area 54 of the first RAM 20 (see FIG. 2). Note that such a program is called "loadable program 54b, 86a" hereinafter. In the present embodiment, proxy response programs for an ICMP (Internet Control Message Protocol), SSDP (Simple Service Discovery Protocol), and mDNS (Multicast Domain Name System) are adopted as the loadable programs 54b, 86a. When the loadable program 86a has been loaded into the first proxy response program storage area 54 of the first RAM 20 (see FIG. 2), the flag indicating "Performable" is recorded in the performable flag 76 corresponding to the loadable program 54b. On the other hand, the flag indicating "Unperformable" is recorded in the performable flag 76 corresponding to the loadable program 86a that is not loaded into the first proxy response program storage area 54 of the first RAM 20 (see FIG. 2).

In the performing address 78, an address where the program used by the sub CPU 24 for performing the proxy response process is recorded. Because the first RAM dedicated program 54a is used while being stored in the first RAM 20, the addresses within the first RAM 20 are recorded in the performing address 78 (see the columns 62 and 64). Because the second RAM dedicated program 88a is used while being stored in the second RAM 22, the address within the second RAM 22 is recorded in the performing address 78 (see the column 66). Because the loadable program 54b is used while being loaded from the second RAM 22 into the first RAM 20 when performed, the addresses within the first RAM 20 are recorded in the performing address 78 (see the columns 68 and 69). For the loadable program 86a that is not yet loaded into the first RAM 20, nothing is recorded in the performing address 78 (see the column 67).

The number of times that the sub CPU 24 uses the loadable program 54b is recorded in the number of use 80. The sub CPU 24 adds "1" to the number of use 80 every time when using the loadable program 54b to perform the process. In the present embodiment, the number of use 80 is a cumulative value obtained after the loadable program 54b is stored in the first RAM 20.

Figure 4:
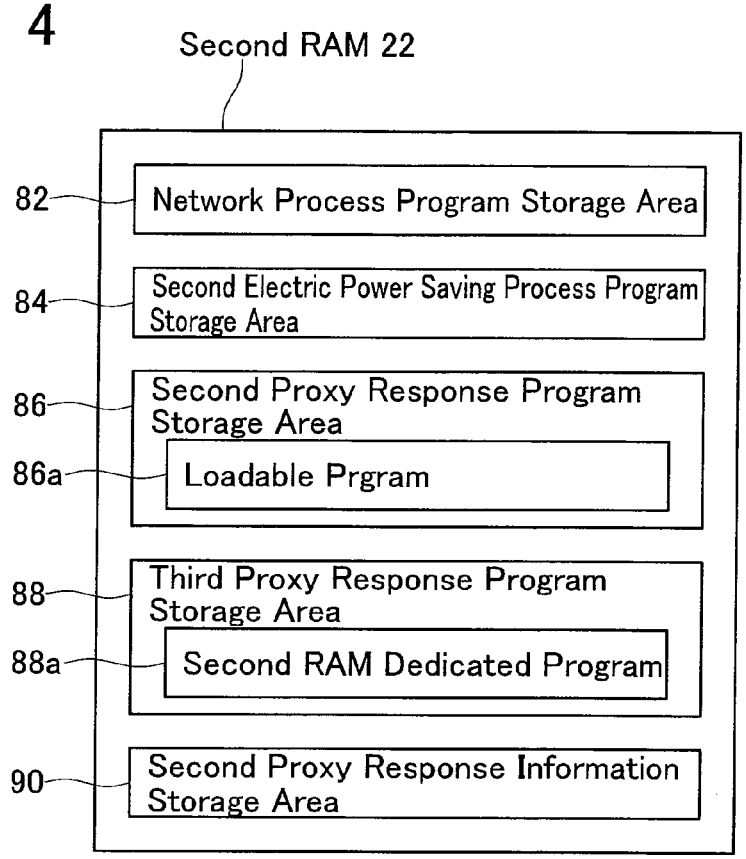
FIG. 4 shows an example of a memory area of a second RAM.

The second RAM 22 (FIG. 1) is an SDRAM. The second RAM 22 is accessible from both the main CPU 14 and the sub CPU 24. The second RAM 22 has a larger total storage capacity than the first RAM 20. For this reason, the power consumption of the second RAM 22 is greater than that of the first RAM 20. FIG. 4 shows an example of a configuration of a storage area of the second RAM 22 (FIG. 1). The second RAM 22 comprises a network process program storage area 82, a second electric power saving process program storage area 84, a second proxy response program storage area 86, a third proxy response program storage area 88, and a second proxy response information storage area 90.

In the network process program storage area 82, a network process program that is used by the main CPU 14 to perform a process for communicating via a network is stored. This network process program includes e.g., programs for performing the response process associated with an ARP, NetBIOS-NS, ICMP, SSDP, mDNS and the like (that is, the response processes that should be performed by the main CPU 14 in the non-sleeping state), and a program for performing a print process in response to a print command. The network process program may also include a program for controlling the MAC controller 28, a TCP/IP protocol stack for performing a process by using a TCP/IP, and a program for performing a process by using various application protocols. When the printer 10 is activated, the main CPU 14 expands and stores the abovementioned network process program stored in the ROM 18, into the network process program storage area 82.

In the second electric power saving process program storage area 84, a program used by the main CPU 14 to perform the electric power saving process (see FIGS. 7 and 8) is stored. When the printer 10 is activated, the main CPU 14 expands and stores the electric power saving process program for the main CPU 14, which is stored in the ROM 18, into the second electric power saving process program storage area 84.

In each of the second proxy response program storage area 86 and the third proxy response program storage area 88, a program that is used by the sub CPU 24 as the proxy of the main CPU 14 to perform a process when the main CPU 14 is in the sleeping state is stored. In the second proxy response program storage area 86, the loadable program 86a mentioned above is stored. Note that, as described above, the loadable program 86a is loaded into the first RAM 20 and used. The second RAM dedicated program 88a mentioned above is stored in the third proxy response program storage area 88.

When the printer 10 is activated, the main CPU 14 expands and stores the second RAM dedicated program 88a, stored in the ROM 18, into the third proxy response program storage area 88. The main CPU 14 then records the address information regarding the address where the second RAM dedicated program 88a is stored in the third proxy response program storage area 88, into the performing address 78 in the column 66 corresponding to the second RAM dedicated program 88a in the proxy response process administration table 60 (see FIG. 3).

Furthermore, when the printer 10 is activated, the main CPU 14 expands and stores the loadable program 86a stored in the ROM 18, into the second proxy response program storage area 86. The main CPU 14 then records the address information of the address where each loadable program 86a of the second proxy response program storage area 86 is stored, into the source address for reading 74 in the column 67, 68 and 69 corresponding to the loadable program 86a in the proxy response process administration table 60 (see FIG. 3).

Note that, as described above, when the printer 10 is activated, the main CPU 14 once expands the first RAM dedicated program 54a stored in the ROM 18, in the second RAM 22. Subsequently, the main CPU 14 loads the first RAM dedicated program 54a from the second RAM 22 to the first proxy response process program storage area 54 of the first RAM 20. The main CPU 14 records the address information of the address where each first RAM dedicated program 54a of the first proxy response process program storage area 54 is stored, into the performing addresses 78 in the columns 62, 64 corresponding to the first RAM dedicated programs 54a in the proxy response process administration table 60 (see FIG. 3). Note that after loading the first RAM dedicated program 54a from the second RAM 22 to the first RAM 20, the main CPU 14 may delete the first RAM dedicated program 54a from the second RAM 22. Alternately, the first RAM dedicated program 54a may be kept in the second RAM 22.

In the second proxy response information storage area 90, information required by the main CPU 14 to perform a process is stored. For example, the IP address, MAC address, node name, status information and the like of the printer 10 are stored. In a case where any of the information items to be stored in the second proxy response information storage area 90 is changed, the main CPU 14 updates the information items stored in the second proxy response information storage area 90.

The MAC controller 28 shown in FIG. 1 converts the format of a packet, which is received by the network I/F 30, into a format that can be processed by the printer 10. When, for example, transmission of a packet is instructed by the main CPU 14, the MAC controller 28 performs so-called DMA (Direct Memory Access) by reading the packet out of the second RAM 22 and transmitting the packet to an external device. The engine controlling circuit 32 controls the print engine 34 according to the command from the main CPU 14. The panel controlling circuit 36 controls the display panel 38 according to the command from the main CPU 14. The display panel 38 is an LCD. The panel controlling circuit 36 shifts (transits) the display panel 38 between an ON state and an OFF state. That is, the panel controlling circuit 36 brings the display panel 38 to the ON state by applying voltage to the display panel 38, and brings the display panel 38 to the OFF state by stopping the application of the voltage.

(State Shift of Printer)

Figure 5:
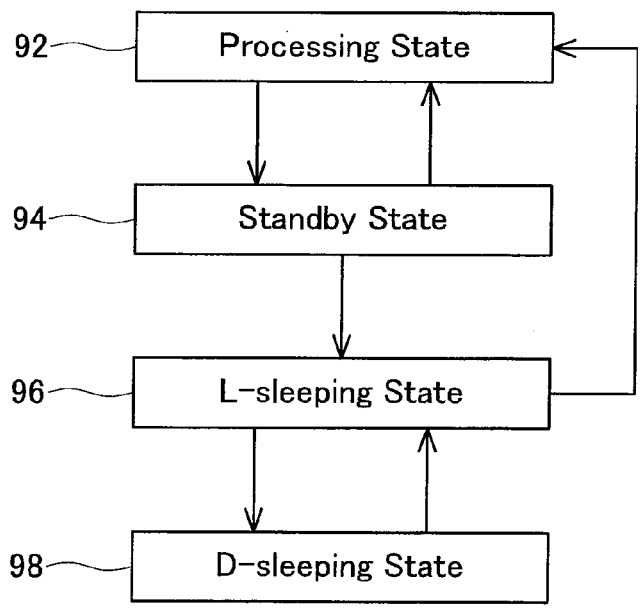
FIG. 5 shows an example of a state shift in a printer.

FIG. 5 shows an example of the state of the printer 10 being shifted (transited) among a processing state 92, a standby state 94, an L-sleeping state 96, and a D-sleeping state 98.

FIG. 6 shows a table 100 that shows the states of the main CPU 14, sub CPU 24, first RAM 20, second RAM 22 and display panel 38 when the printer 10 is in the states 92, 94, 96 and 98. When the printer 10 is activated, the printer 10 enters the standby state 94. As shown in FIG. 6, in the standby state 94 clocks are supplied to the two CPUs 14 and 24 (that is, the two CPUs 14 and 24 are in the non-sleeping state). The two RAMs 20 and 22 are in the normal operation mode, and the display panel 38 is in the ON state.

In a case where the printer 10 is in the standby state 94 and normal processes other than a process of responding to a request (packet) from the external device via the network is performed, the state of the printer 10 is shifted to the processing state 92. Note that the normal processes described above include the print process performed in response to the print command, and a display process performed when the display panel 38 is operated by a user. As with the standby state 94, in the processing state 92, the two CPUs 14 and 24 are in the non-sleeping state, the two RAMs 20 and 22 in the normal operation mode, and the display panel 38 in the ON state. The difference between the processing state 92 and the standby state 94 is whether the main CPU 14 performs the normal processes mentioned above. When the main CPU 14 finishes the normal processes mentioned above, the state of the printer 10 is shifted to the standby state 94.

When the state of the printer 10 is shifted to the standby state 94, the main CPU 14 starts the standby state timer described above. When the standby state 94 is continued for a predetermined amount of time, the main CPU 14 instructs the panel controlling circuit 36 (see FIG. 1) to bring the display panel 38 to the OFF state. As a result, the state of the printer 10 is shifted to the L-sleeping state 96. In the L-sleeping state 96, the two CPUs 14 and 24 are in the non-sleeping state, the two RAMs 20 and 22 in the normal operation mode, and the display panel 38 in the OFF state. Therefore, the electricity consumed by the display panel 38 can be reduced. When the main CPU 14 performs the abovementioned normal processes (e.g., print process, display process) in the L-sleeping state 96, the state of the printer 10 is shifted to the processing state 92.

The printer 10 enters the D-sleeping state 98 from the L-sleeping state 96 by performing a state shift process described hereinafter (see FIGS. 7 and 8). In the D-sleeping state 98, the main CPU 14 is in the sleeping state (the state where the clock signal is not supplied), the sub CPU 24 is in the non-sleeping state, the first RAM 20 in the normal operation mode, the second RAM 22 in a self refresh mode for maintaining the information of each cell therein (i.e., a mode in which the power consumption is lower than that in the case of the normal operation mode), and the display panel 38 in the OFF state. In the D-sleeping state, when the main CPU 14 needs to perform the normal processes mentioned above (the print process, display process, etc.), the state of the printer 10 is shifted to the processing state 92 through the L-sleeping state 96.

(Electric Power Saving Process by Main CPU)

Next, the detail of the processes performed by the main CPU 14 is described with reference to FIGS. 7 and 8. The process shown in FIGS. 7 and 8 are started when the printer 10 is activated and the main CPU 14 resets the standby state timer. At the point of time when the printer 10 is activated, the printer 10 is in the standby state 92. The main CPU 14 stores the state variable indicating the standby state 94, in the state variable storage area 58 of the first RAM 20 (see FIG. 2). The main CPU 14 performs the following processes by using the programs stored in the second electric power saving process program storage area 84 of the second RAM 22 (see FIG. 4).

The main CPU 14 determines whether the state variable stored in the state variable storage area 58 indicate the standby state 94 or not (S10). If the result is YES the main CPU 14 proceeds to S12. If the result is NO the main CPU 14 repeats the determination in S10. In S12, the main CPU 14 determines whether the measurement time of the standby state timer has elapsed a predetermined time period. Note that the standby state timer is reset each time when the state of the printer 10 is shifted to the standby state 94. When the result of S12 is NO, the main CPU 14 returns to S10. When the result of S12 is YES, the main CPU 14 proceeds to S14. In S14, the main CPU 14 changes the state variable stored in the state variable storage area 58 to a state variable indicating the L-sleeping state 96. Subsequently, the main CPU 14 instructs the panel controlling circuit 36 to stop the application of the voltage to the display panel 38 (S16). When the application of the voltage is stopped as a result of this step, the display panel 38 enters the OFF state.

Next, the main CPU 14 determines whether the state variable stored in the state variable storage area 58 indicate the L-sleeping state 96 or not (S18). There is a possibility that the state variable stored in the state variable storage area 58 is changed by the main CPU 14 or sub CPU 24 performing a process other than those shown in FIGS. 7 and 8. For example, when supply of clocks is started again in S68 shown in FIG. 10 as will be described hereinafter, the main CPU 14 performs the normal processes described above (print process, display process, etc.). In so doing, the main CPU 14 changes the state variable stored in the state variable storage area 58 to the processing state 92. In this case, when determining as YES in S18, the main CPU 14 instructs the panel controlling circuit 36 to apply voltage to the display panel 38 (S20) and returns to S10. As a result, the display panel 38 enters the ON state.

When, on the other hand, the result of S18 is YES, the main CPU 14 determines whether the state of the printer 10 can be shifted to the D-sleeping state 98 or not, by performing the state shift determining process (which is described hereinbelow) (S22). When the process of S22 is ended, the main CPU 14 checks whether it is determined in the process of S22 that the state of the printer 10 is able to shift to the D-sleeping state 98 (S24). When the result is YES here, the main CPU 14 proceeds to S28 shown in FIG. 8. When the result is NO, the main CPU 14 proceeds to S26. In S26, the main CPU 14 performs a WAIT command. When the WAIT command is performed, the main CPU 14 enters a performance stopping state to stand by until receiving an interruption request. Consequently, the power consumption of the main CPU 14 can be reduced. While the main CPU 14 is in the performance stopping state, the MAC controller 28, for example, performs the DMA and transmits the packet to the external device. The main CPU 14 returns to S18 once it receives the interruption request in S26.

In S28, the main CPU 14 stores, into the first proxy response information storage area 56 of the first RAM 20 (see FIG. 2), information for the sub CPU 24 to perform a process as the proxy of the main CPU 14. In particular, predetermined information out of the information stored in the second proxy response information storage area 90 of the second RAM 22 (see FIG. 4) (that is, the information used by the main CPU 14 to perform the response process), is stored in the first proxy response information storage area 56 by the main CPU 14. The main CPU 14 subsequently masks (prohibits) the interruption request issued by a unit other than the sub CPU 24 (S30). The main CPU 14 changes the state variable indicating the L-sleeping state 96, which is stored in the state variable storage area 58, to the state variable indicating the D-sleeping state 98 (S32). Next, the main CPU 14 issues the interruption request to request the sub CPU 24 to perform future processes (S34). The main CPU 14 performs the WAIT command (S36). When the WAIT command is performed, the main CPU 14 enters the performance stopping state to stand by until receiving the interruption request. The main CPU 14 proceeds to S38 once the main CPU 14receives the interruption request in S36 (S70 in FIG. 10 described hereinafter). The main CPU 14 then releases the mask of the interruption request performed in S30 (S38), and returns to S18 shown in FIG. 7. Specifically, the main CPU 14 performs the process of S18 shown in FIG. 7 once the main CPU 14 receives the interruption request.

(State Shift Determining Process of Main CPU)

Figure 7:
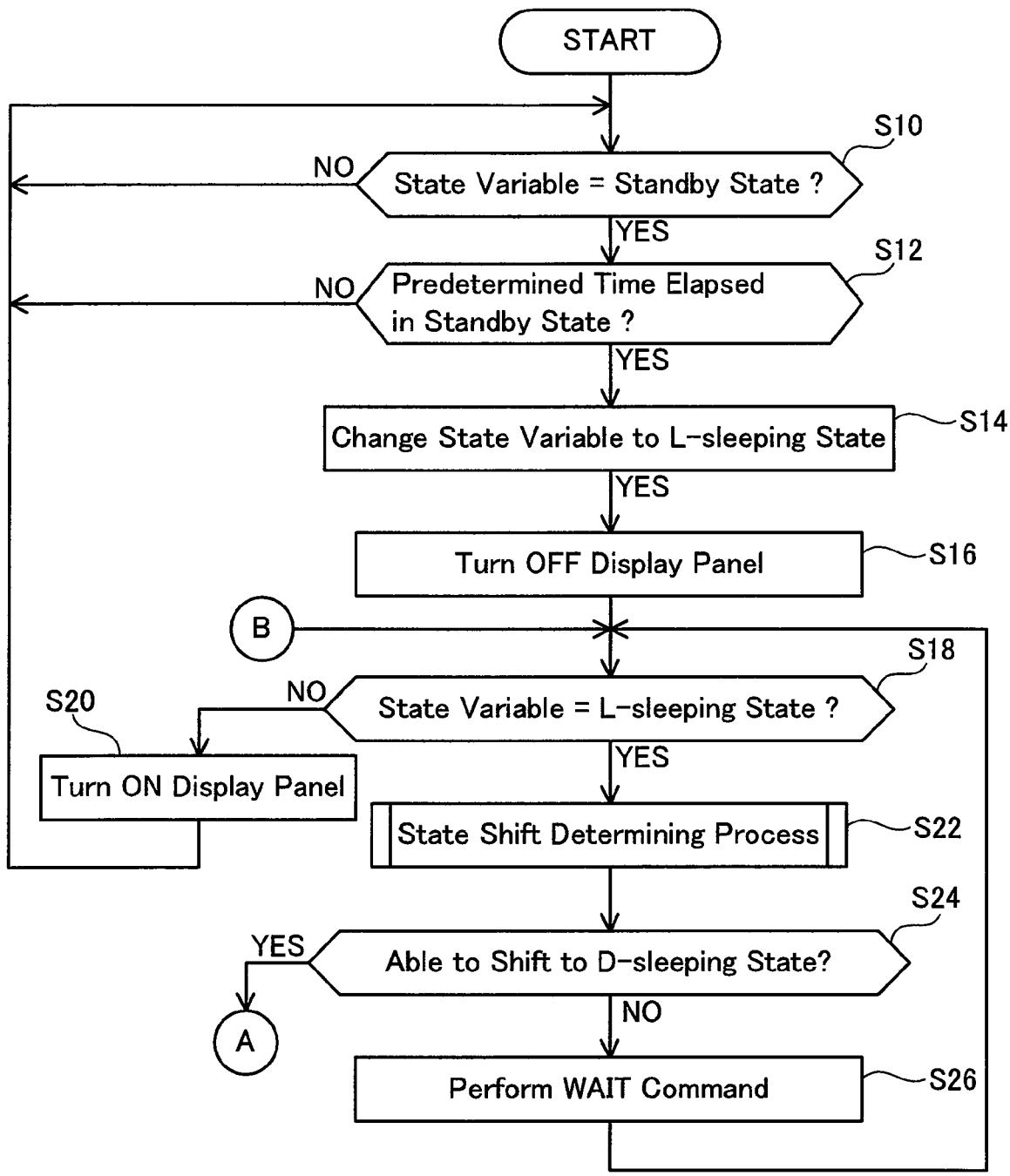
FIG. 7 shows a flowchart of a state shift process performed by a main CPU.
Figure 8:
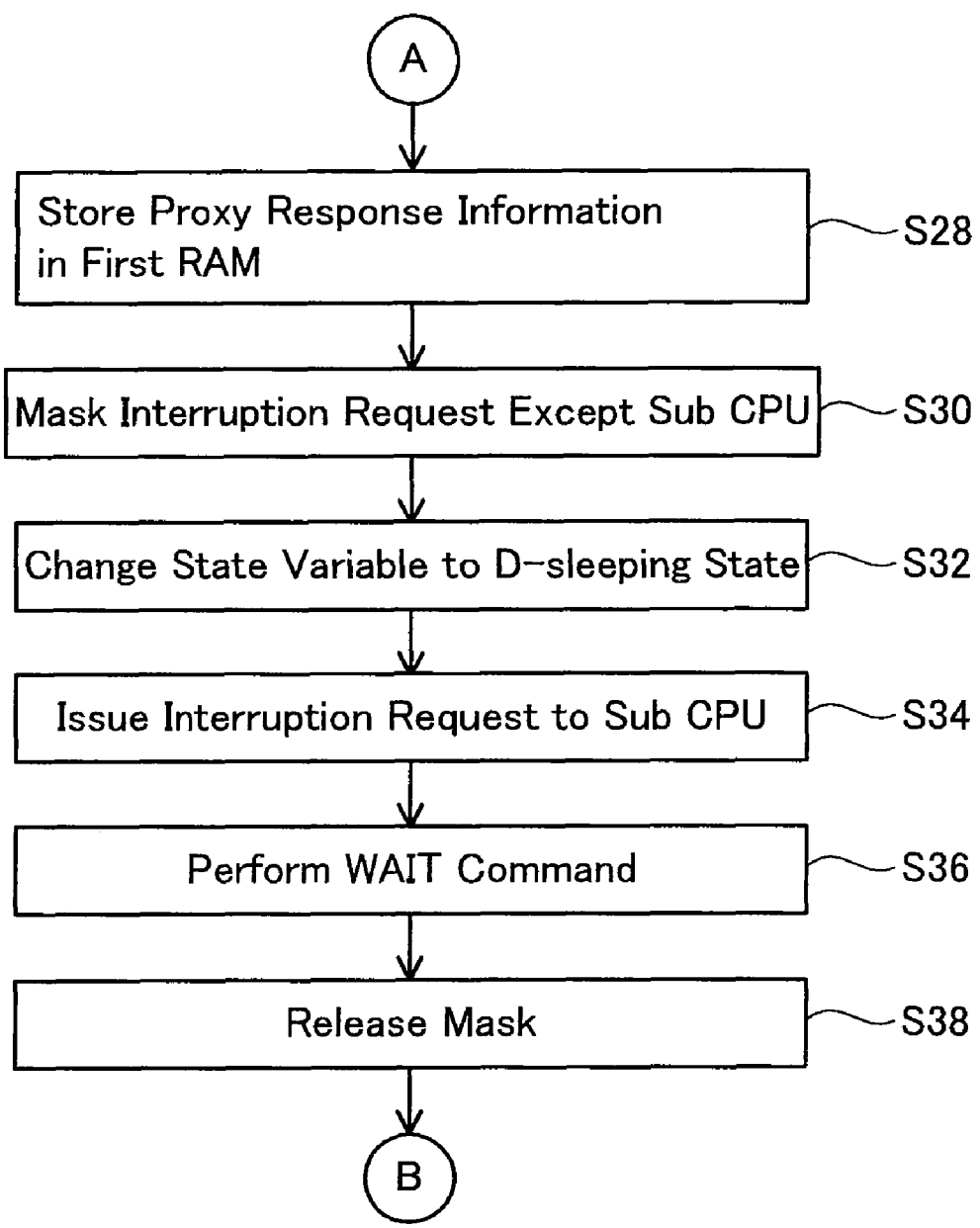
FIG. 8 shows a flowchart subsequent the flowchart shown in FIG. 7.
Figure 9:
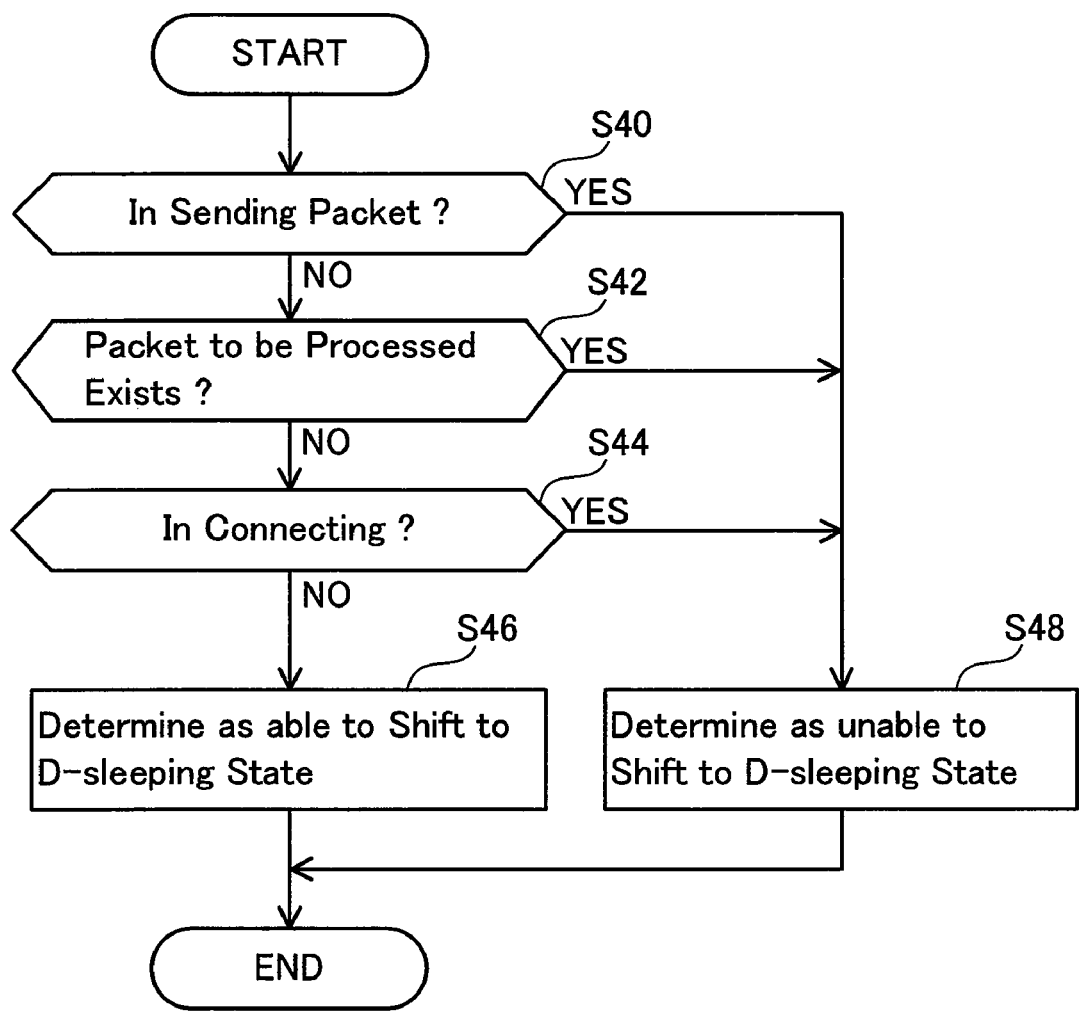
FIG. 9 shows a flowchart of a state shift determining process performed by the main CPU.

Next, the detail of the state shift determining process performed by the main CPU 14 in S22 of FIG. 7 is described with reference to FIG. 9. The main CPU 14 determines whether the packet is transmitted to the external device or not (S40). For example, in a case where the main CPU 14 is in the middle of responding to a request on the status of the printer 10 from the external device (not shown), it is determined that the result of S40 is YES. When the result of S40 is YES, the main CPU 14 proceeds to S48. When the result of S40 is NO, the main CPU 14 determines whether a packet to be processed by the main CPU 14 is stored in the second RAM 22 or not (S42). For example, in a case where the main CPU 14 has received the request on the status of the printer 10 from the external device but has not yet processed the request, it is determined that the result of S42 is YES. When the result of S42 is YES, the main CPU 14 proceeds to S48. When the result of S42 is NO, the main CPU 14 proceeds to S44. In S44, the main CPU 14 determines whether or not there is an external device that is in connection with the printer 10. For example, when the printer 10 comprises a Web server function and the external device is in TCP-connection with the Web server of the printer 10, it is determined that the result of S44 is YES. When the result of S44 is YES, the main CPU 14 proceeds to S48. When the result of S44 is NO, the main CPU 14 proceeds to S46.

In S48 the main CPU 14 determines that the state of the printer 10 is unable to be shifted to the D-sleeping state 98. In this case, the main CPU 14 determines that the result of S24 shown in FIG. 7 is NO. In S46, on the other hand, the main CPU 14 determines that the state of the printer 10 is able to be shifted to D-sleeping state 98. In this case, the main CPU 14 determines that the result of S24 in FIG. 7 is YES.

(Electric Power Saving Process by Sub CPU)

Figure 10:
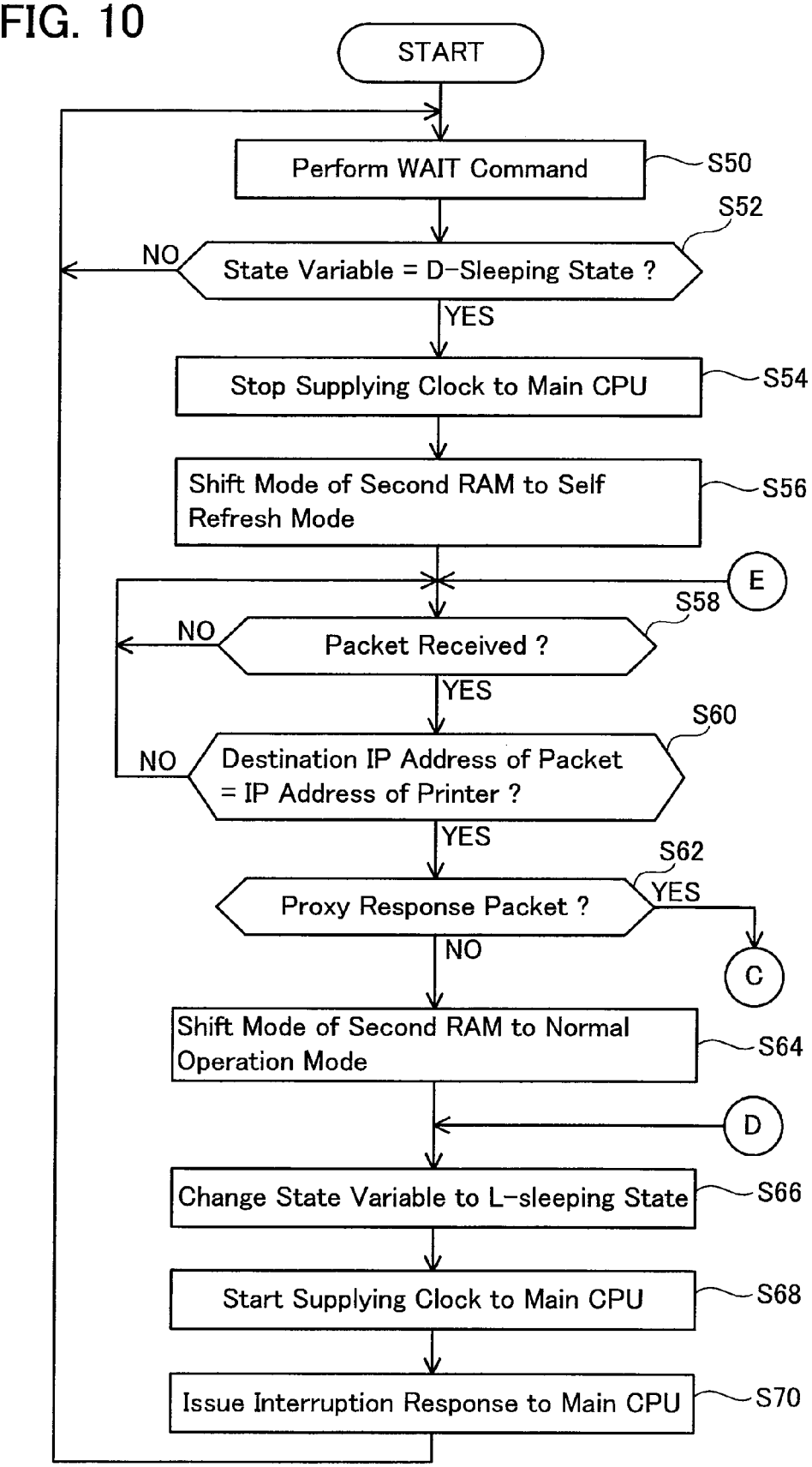
FIG. 10 shows a flowchart of a state shift process performed by a sub CPU.
Figure 11:
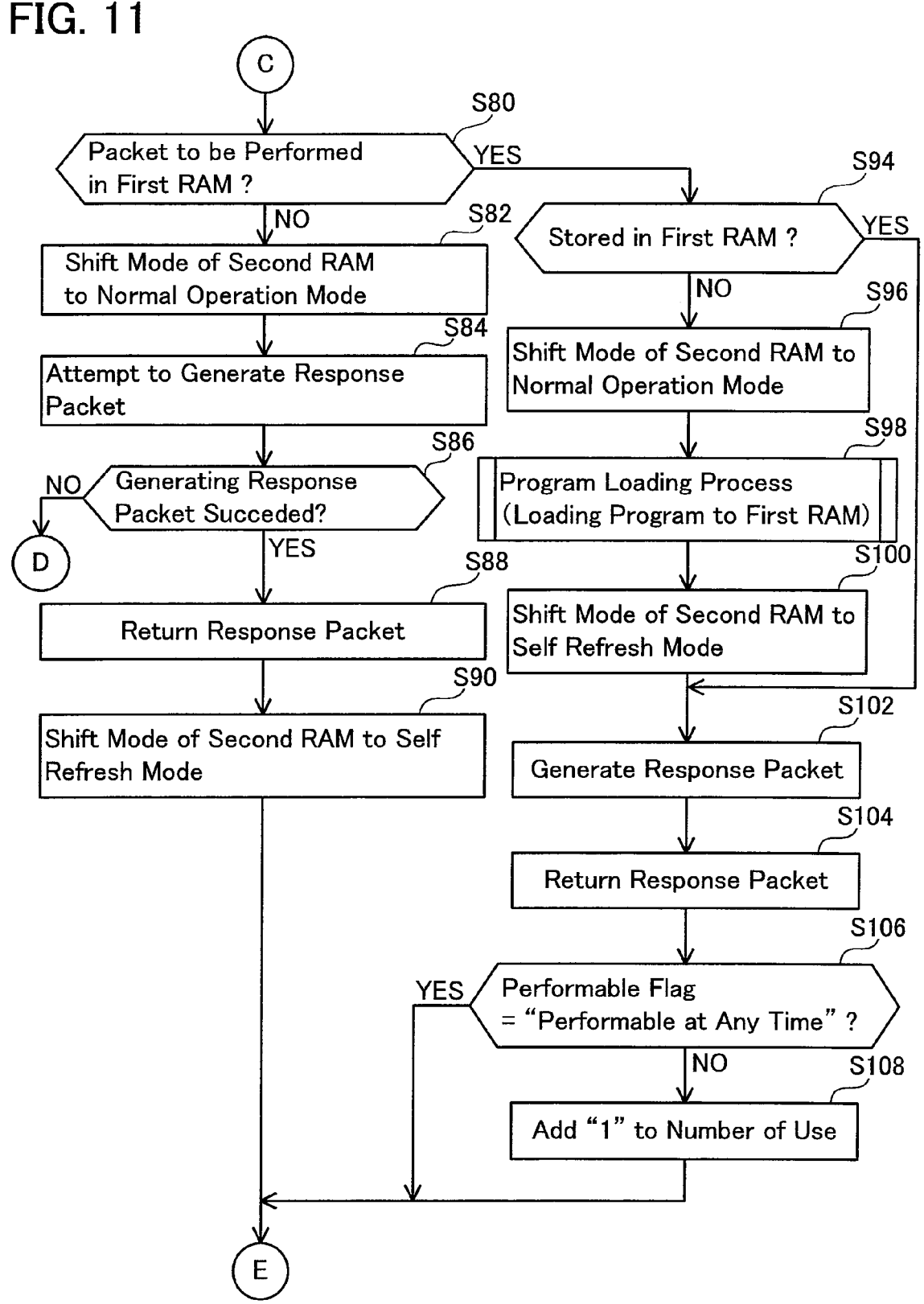
FIG. 11 shows a flowchart subsequent to the flowchart shown in FIG. 10.

Next, the electric power saving process performed by the sub CPU 24 is described with reference to FIGS. 10 and 11. The processes shown in FIGS. 10 and 11 are begun with the activation of the printer 10 as a trigger. The sub CPU 24 performs the following processes by using the programs stored in the first electric power saving process program storage area 52 of the first RAM 20 (see FIG. 2). First, the sub CPU 24 performs the WAIT command (S50). The sub CPU 24 stands by until the sub CPU 24 receives the interruption request (shifts (transits) to the performance stopping state). As described above, in S34 shown in FIG. 8, the main CPU 14 issues the interruption request to the sub CPU 24. This releases the performance stopping state of the sub CPU 24 to allow the sub CPU 24 to proceed to S52.

In S52 the sub CPU 24 determines whether the state variable stored in the state variable storage area 58 of the first RAM 20 (see FIG. 2) indicate the D-sleeping state 98. When the result of S52 is NO, the sub CPU 24 proceeds to S50. In other words, the sub CPU 24 stands by in the performance stopping state when the state variable indicates the state other than the D-sleeping state 98.

When the result of S52 is YES, the sub CPU 24 instructs the main clock circuit 16 (see FIG. 1) to stop supplying clocks (S54). As a result, the state of the main CPU 14 shifts (transits) from the non-sleeping state to the sleeping state. The sub CPU 24 then shifts (changes) the mode of the second RAM 22 from the normal operation mode to the self refresh mode (S56). While the second RAM 22 is in the self refresh mode, the information cannot be read from the second RAM 22. In a case where the second RAM 22 is in the self refresh mode, the power consumption in the second RAM 22 is lower than when the second RAM 22 is in the normal operation mode. The sub CPU 24 monitors that the packet is received from the external device (S58). Once the packet is received (YES in S58), the sub CPU 24 determines whether the IP address of the printer 10 is designated as the destination to which the packet is transmitted (S60). Note that in a case where the packet is a broadcast packet, it is determined that the result of S60 is YES. When the result of S60 is NO, the sub CPU 24 returns to S58. When, on the other hand, the result of S60 is YES, the sub CPU 24 determines whether or not the received packet is a packet to be processed by the sub CPU 24 as the proxy of the main CPU 14, that is, whether or not the received packet is a packet that is subjected to the proxy response process (S62). Specifically, the sub CPU 24 determines whether or not the protocol 70 of the proxy response process administration table 60 has a protocol matching the protocol of the received packet. The packet that cannot be subjected to the proxy response process by the sub CPU 24 means, for example, a packet that requires the information stored only in the second proxy response information storage area 90 of the second RAM 22 (e.g., setting information of the printer 10), or a packet that can be processed only by a program that is available to the main CPU 14 only.

When the result of S62 is YES, the sub CPU 24 proceeds to S80 shown in FIG. 11. When the result of S62 is NO, the sub CPU 24 proceeds to S64. In S64, the sub CPU 24 shifts the mode of the second RAM 22 from the self refresh mode to the normal operation mode. The sub CPU 24 changes the state variable indicating the D-sleeping state 98, which is stored in the state variable storage area 58 of the first RAM 20 (see FIG. 2), to the state variable indicating the L-sleeping state 96 (S66). The sub CPU 24 then instructs the main clock circuit 16 (see FIG. 1) to start supplying a clock to the main CPU 14 (S68). As a result, the main CPU 14 changes the state thereof from the sleeping state to the non-sleeping state. The sub CPU 24 issues the interruption request to the main CPU 14 (S70) and returns to S50. As a result, the performance stopping state of the main CPU 14, which is caused as a result of the WAIT command performed in S36 in FIG. 8, is released. The main CPU 14 shifts to S18 shown in FIG. 7, and further performs the process corresponding to the packet received in S58 shown in FIG. 10 (to be referred to as "received packet" hereinafter).

In S80 shown in FIG. 11, the sub CPU 24 determines, by referring to the proxy response process administration table 60 (see FIG. 3), whether the performing RAM 72 associated with the protocol 70 of the received packet is "first RAM" or not (S80). That is, the sub CPU 24 determines whether the proxy response program to be used is the first RAM dedicated program 54a or the loadable program 54b. When the result is NO, that is, when the proxy response program to be used is the second RAM dedicated program 88a, the sub CPU 24 proceeds to S82. On the other hand, when the result is YES, that is, when the proxy response program to be used is the first RAM dedicated program 54a or the loadable program 54b, the sub CPU 24 proceeds to S94.

The present embodiment explains the steps from S82 through S90 with an example in which the proxy response program to be used by the sub CPU 24 is the proxy response program for "SNMP" (the second RAM dedicated program 88a). In S82, the sub CPU 24 shifts the mode of the second RAM 22 to the normal operation mode. The sub CPU 24 then attempts to generate a response packet corresponding to the received packet, by using a program existing in an address within the second RAM 22 that is designated by the performing address 78 corresponding to the SNMP (the column 66 in FIG. 3) (S84). The sub CPU 24 determines whether the response packet is generated or not (S86). In the present embodiment, in a case where the received packet is a GET command of the SNMP (e.g., a command for requesting the status of the printer 10), the sub CPU 24 can generate the response packet. On the other hand, in a case where the received packet is a SET command of the SNMP (e.g., a command for changing the set values of the printer 10), the sub CPU 24 cannot generate the response packet. Moreover, in a case where the received packet is the GET command of the SNMP and the command for requesting the set values of the printer 10 (e.g., the resolution, paper size, etc.), the sub CPU 24 cannot generate the response packet. When the result of S86 is NO, the sub CPU 24 returns to S66 shown in FIG. 10. The sub CPU 24 shifts the state of the main CPU 14 to the non-sleeping state (S66 in FIG. 10). Then, the main CPU 14 results in generating the response packet.

However, when, the result of S86 is YES, the sub CPU 24 replies the generated response packet to the transmission source of the received packet (S88). Once the generation of the response packet is ended, the sub CPU 24 shifts the mode of the second RAM 22 to the self refresh mode again (S90) and returns to S58 shown in FIG. 10.

On the other hand, in S94, the sub CPU 24 determines whether the proxy response program to be used is stored in the first RAM 20 or not. That is, the sub CPU 24 determines whether the performable flag 76 corresponding to the proxy response program to be used is "Performable" or "Performable at Anytime" by referring to the proxy response process administration table 60 (see FIG. 3). When the result is NO, that is, when the performable flag 76 corresponding to the proxy response program to be used is "Unperformable," the sub CPU 24 proceeds to S96. When the result is YES, the sub CPU 24 proceeds to S102.

In S96, the sub CPU 24 shifts the mode of the second RAM 22 to the normal operation mode. The sub CPU 24 then loads the proxy response program to be used (that is, the loadable program 86a) from the second RAM 22 into the first RAM 20 (S98). The program loading process in this step S98 is described later in detail. Once the sub CPU 24 loads the loadable program 86a into the first RAM 20, the sub CPU 24 shifts the mode of the second RAM 22 to the self refresh mode (S100). Note that the process performed in S100 may be performed subsequently to the process of S108, which is described hereinafter, or performed during the processes from S102 through S108. The process of S100 may alternately be performed in a different thread performed in parallel with the processes between S102 and S108.

In S102, the sub CPU 24 uses the proxy response program to generate the response packet corresponding to the received packet. The following three programs can be considered as the proxy response program used in S102.

(1) The loadable program 54b that is loaded into the first RAM 20 in S98 in accordance with the most recently received packet (i.e., currently processing packet).

(2) The loadable program 54b that has been loaded into the first RAM 20 in accordance with one of the received packets that had previously been received before the most recently received packet (the result of S94 is YES in this case). (3) The first RAM dedicated program 54a (the result of S94 is YES in this case as well).

Subsequently, the sub CPU 24 replies the generated response packet to the transmission source of the received packet (S104). The sub CPU 24 determines whether the performable flag 76 (see FIG. 3) corresponding to the proxy response program used in the process of S102 is "Performable at Anytime" or not, that is, whether the performable flag 76 is the first RAM dedicated program 54a or not (S106). When the result of S106 is YES, the sub CPU 24 skips S108 and returns to S58 shown in FIG. 10. When, on the other hand, the result of S106 is NO, the sub CPU 24 adds "1" to the number of use 80 (see FIG. 3) corresponding to the proxy response program used in the process of S102 (S108), and returns to S58 shown in FIG. 10. In other words, the sub CPU 24 adds "1" to the number of use 80 of the program when performing the process of S102 by using the loadable program 54b.

(Program Loading Process by Sub CPU)

Figure 12:
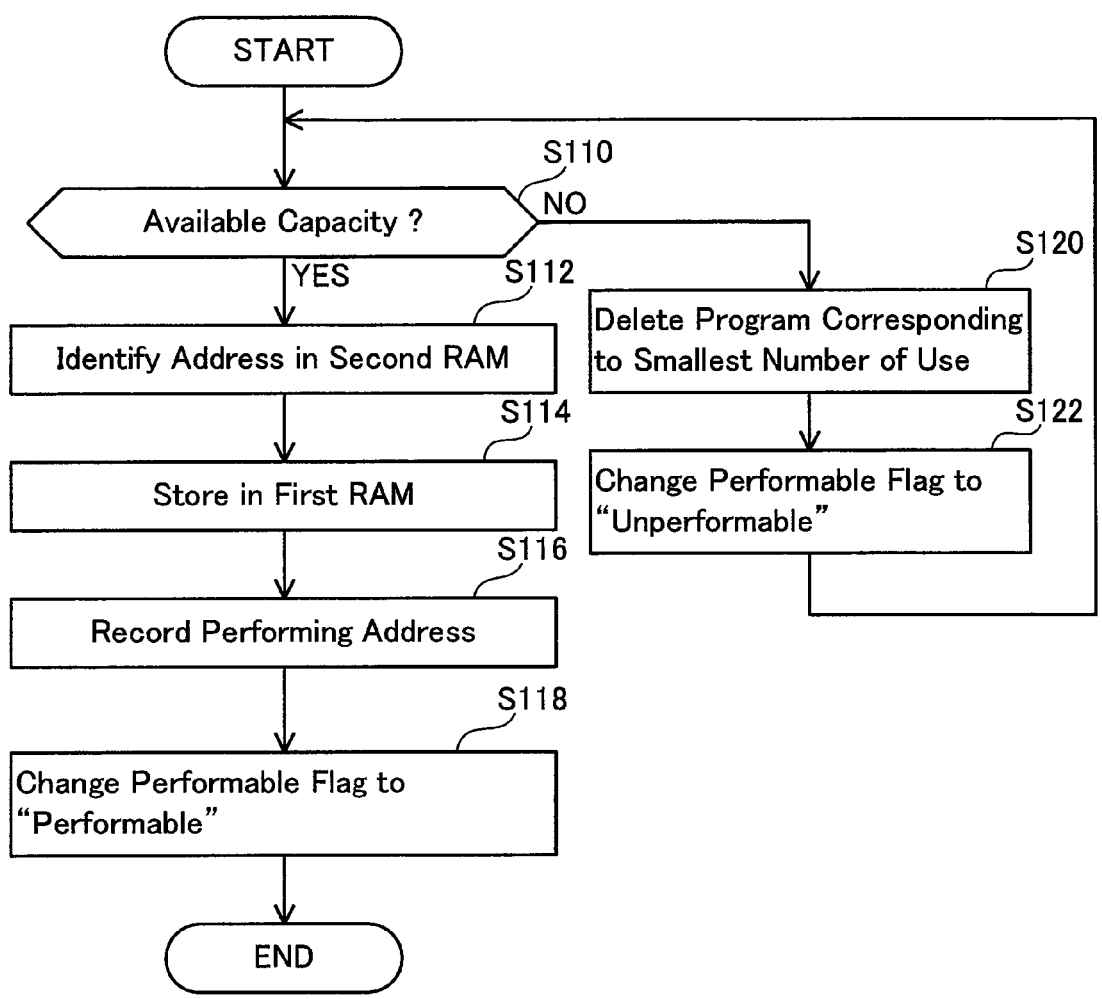
FIG. 12 shows a flowchart of program loading process performed by the sub CPU.

Next, the detail of the program loading process performed by the sub CPU 24 (S98 in FIG. 11) is described with reference to FIG. 12. The sub CPU 24 determines whether or not the first proxy response program storage area 54 of the first RAM 20 (see FIG. 2) has an available capacity for storing the loadable program 86a to be used (S110). When the result of S110 is YES, the sub CPU 24 refers to the proxy response process administration table 60 (FIG. 3) to specify the Address for Reading 74 (address within the second RAM 22) corresponding to the loadable program 86a to be used (S112). The sub CPU 24 loads and stores the loadable program 86a stored in the specified address, into the first proxy response program storage area 54 (see FIG. 2) (S114). Subsequently, the sub CPU 24 records the address of a new loadable program 54b stored in the first RAM 20, into the performing address 78 corresponding to the stored loadable program 54b (see FIG. 3) (S116). In addition, the sub CPU 24 changes the performable flag 76 (see FIG. 3) corresponding to the newly stored loadable program 54b to "Performable" (S118) and ends the process.

When, on the other hand, the result of S110 is NO, the sub CPU 24 deletes, from the first proxy response program storage area 54, the loadable program 54b having the smallest number of use 80, among one or more loadable programs 54b stored in the first proxy response program storage area 54 (see FIG. 2) (S120). For example, in a case where the loadable program 54b of "SSDP" and the loadable program 54b of "mDNS" that are shown in FIG. 3 are stored in the first proxy response program storage area 54, the sub CPU 24 compares the numbers of use 80 corresponding to the protocols of these two programs (see FIG. 3). The sub CPU 24 then deletes the loadable program 54b of "SSDP" corresponding to smaller number in the number of use 80, from the first proxy response program storage area 54. Note that in the configuration of the present embodiment, the first RAM dedicated program 54a is not deleted from the first proxy response program storage area 54. Next, the sub CPU 24 changes the performable flag 76 (see FIG. 3) corresponding to the deleted loadable program 54b (for example, "SSDP") to "Unperformable" (S122). In this case, the performing address 78 corresponding to the deleted loadable program 54b and the number of use 80 are also deleted. Thereafter, the sub CPU 24 returns to S110. That is, the sub CPU 24 determines, again, whether the first RAM 20 has an available capacity (S110). When the result of S110 is NO, the loadable program 54b other than the program corresponding to "SSDP" is also deleted.

The above has described the printer 10 of the present embodiment in detail. Once the main CPU 14 of the printer 10 determines that the state of the printer 10 can be shifted to D-sleeping state 98 (YES in S24 shown in FIG. 7), the main CPU 14 changes the state variable stored in the first RAM 20 to "D-sleeping state" (S32 in FIG. 8). When the state variable indicates "D-sleeping state" (YES in S52 shown in FIG. 10), the sub CPU 24 shifts the state of the main CPU 14 to the sleeping state, and shifts the mode of the second RAM 22 to the self refresh mode. In this manner, the power consumption of the printer 10 can be reduced.

In a case where the printer 10 is in the D-sleeping state 98, the sub CPU 24 performs the response process on the received packet, as the proxy of the main CPU 14. In a case of performing the proxy response process by using the programs stored in the first RAM 20 (the first RAM dedicated program 54a and the loadable program 54b), the sub CPU 24 performs the proxy response process by using the programs stored in the first RAM 20, while maintaining the second RAM 22 in the self refresh mode. According to this configuration, the electric powers of the memories can be saved more, compared to when the programs are stored in one common memory. Specifically, in such a case where one memory is used, it is difficult to set the mode of this memory to the low power consumption mode. However, by using the first RAM 20 and the second RAM 22 as in the present embodiment, the mode of one of the memories (the second RAM 22) can be set to the low power consumption mode (self refresh mode). As a result, the electric powers of the memories of the printer 10 can be saved. Moreover, the total storage capacity of the first RAM 20 is smaller than that of the second RAM 22. For this reason, by shifting (changing) the mode of the second RAM 22 having a larger storage capacity to the low power consumption mode (self refresh mode) as in the present embodiment, the power consumption of the printer 10 can be reduced more than in a case where the mode of the first RAM 20 having a smaller storage capacity to the low power consumption mode.

In a case where the sub CPU 24 performs the processes using the program that is not stored in the first RAM 20 (the loadable program 86a), the sub CPU 24 shifts the mode of the second RAM 22 from the self refresh mode to the normal operation mode. In so doing, the main CPU 14 is still maintained in the sleeping state. Consequently, the power consumption of the main CPU 14 can be reduced.

The printer 10 stores the first RAM dedicated program 54a out of the proxy response programs of the sub CPU 24, in the first RAM 20 at the time of the activation of the printer 10. On the other hand, in the printer 10 the loadable program 86a is not stored in the first RAM 20 at the time of the activation of the printer 10. This way, the storage capacity of the first RAM 20 can be reduced by reducing the number of types of programs stored in the first RAM 20. In a case of attempting to store the loadable program 54b in the first RAM 20 but the first RAM 20 does not have enough available capacity (i.e., in short of a storage area for storing the loadable program 54b) (NO in S110 shown in FIG. 12), the new program is stored in the first RAM 20 after deleting one or more programs stored therein. According to this configuration, it is not necessary to increase the storage capacity of the first RAM 20. Therefore, the power consumption of the printer 10 can be reduced.

In the case of deleting the programs stored in the first RAM 20, the sub CPU 24 deletes the program having the smallest number of use 80. If the sub CPU 24 has deleted a specific program, and the aforesaid specific program is to be used after having erased it from the first RAM 20, the sub CPU 24 needs shift the mode of the second RAM 22 to the normal operation mode and store the specific program from the second RAM 22 to the first RAM 20. Hence, in a case where the specific program that is used frequently is erased, the frequence in which the mode of the second RAM 22 needs to be shifted to the normal operation mode increases. Therefore, it is preferred that the specific program described above be a program having the minimum use, out of the first type of the second programs stored already in the first RAM 20. As a result, the frequence in which the mode of the second RAM 22 is shifted from the self refresh mode to the normal operation mode can be reduced. Furthermore, the number of times the sub CPU 24 has to load the programs required for the processes from the second RAM 22 can be reduced.

As is clear from the description above, the printer 10 is an example of "a processing device". The main CPU 14 and the sub CPU 24 are examples of "a first controlling unit" and "the second controlling unit" respectively. The first RAM 20 and the second RAM 22 are examples of "a first memory" and "a second memory" respectively.

In addition, the first RAM dedicated program 54a (program for "ARP" and "NetBIOS-NS") is an example of "a first program". The second RAM dedicated program 88a (program for "SNMP") and the loadable programs 54b, 86a (programs for "ICMP," "SSDP," and "mDNS") are examples of "a second program". The loadable programs 54b, 86a are examples of "a first type of the second program". The second RAM dedicated program 88a is an example of "a second type of the second program".

(Modifications)

(1) In the printer 10 described above, the sub CPU 24 is maintained in the non-sleeping state while the printer 10 is activated. However, another configuration is possible in which the sub CPU 24 is shifted between the non-sleeping state and the sleeping state while the printer 10 is activated. For example, the sub CPU 24 may be set to the sleeping state when the printer 10 is in one of the processing state, standby state and L-sleeping state. Further, the sub CPU 24 may be set to the non-sleeping state when the printer 10 is in the D-sleeping state. In this case, the main CPU 14 may control the sub clock circuit 26. In a case of changing the state variable to the D-sleeping state 98 (S32 in FIG. 8), the main CPU 14 may supply the clock signal to the sub CPU 24. The sub CPU 24 may perform the processes subsequent to S54 shown in FIG. 10 after the state thereof is shifted from the sleeping state to the non-sleeping state.

(2) In the printer 10 described above, the first RAM 20 is maintained in the normal operation mode while the printer 10 is activated. However, another configuration is possible in which the first RAM 20 is shifted between the normal operation mode and the self refresh mode (low power consumption mode) while the printer 10 is activated. In this case, the first RAM 20 may be brought to the self refresh mode in a case where the main CPU 14 is in the non-sleeping state, and may be brought to the normal operation mode in a case where the main CPU 14 is in the sleeping state. In a case of the configuration in which the sub CPU 24 is shifted between the non-sleeping state and the sleeping state while the printer 10 is activated, the first RAM 20 may be brought to the normal operation mode when the sub CPU 24 is in the non-sleeping state, and may be brought to the self refresh mode when the sub CPU 24 is in the sleeping state.

(3) In the printer 10 described above, the main CPU 14 performs the processes by using the programs stored in the second RAM 22. However, the programs used by the main CPU 14 may be stored in the first RAM 20 and the second RAM 22dispsersedly.

(4) In the printer 10 described above, in a case of deleting the loadable program 54b stored in the first RAM 20, the sub CPU 24 deletes the loadable program 54b having the smallest number of use 80 after having been stored in the first RAM 20. However, among the erasable loadable programs 54b (programs in which the performable flag 76 shows "Performable" in the proxy response process administration table 60), the sub CPU 24 may selectively erase a loadable program 54b that enables to secure a storage area large enough to store the loadable program 86a to be stored. In this case, when only one loadable program 54b is selected, the sub CPU 24 erases the selected program. When a plurality of loadable programs 54b are selected, the sub CPU 24 may erase the loadable program 54b having the smallest number of use 80, from among these plurality of loadable programs 54b.

Moreover, in the printer 10 described above, of the programs stored in the first RAM 20, erasable programs are the programs in each of which the performable flag 76 shows "Performable" (loadable program 54b) in the proxy response process administration table 60. However, the first RAM 20 dedicated program 54a recorded in the proxy response process administration table 60 may be regarded as the erasable program. In this case, the number of use 80 may be counted in each of the erasable programs recorded in the proxy response process administration table 60, and the program corresponding to the smallest number of use 80 after being stored in the first RAM 20 may be erased.

In the printer 10 described above, the number of use 80 is a cumulative value that is obtained since the programs are stored in the first RAM 20. However, the number of use 80 may be a cumulative value that is obtained since the activation of the printer 10, or a cumulative value that is obtained since the printer 10 is used by the user.

Additionally, in the printer 10 described above, the loadable program 54b corresponding to smaller number of use 80 is erased, but the loadable program 54b that are stored in the past may be orderly erased from the oldest one.

(5) In the printer 10 described above, the storage capacity of the first RAM 20 is smaller than the storage capacity of the second RAM 22. However, the storage capacity of the first RAM 20 may be larger than or equal to the storage capacity of the second RAM 22. In the printer 10, the operating frequency of the sub CPU 24 is smaller than the operating frequency of the main CPU 14. However, the operating frequency of the sub CPU 24 may be greater than or equal to the operating frequency of the main CPU 14.

(6) The printer 10 described above comprises the ROM 18, the first RAM 20 and the second RAM 22. However, the printer 10 may comprise only the ROM 18 and the first RAM 20. In this case, the ROM 18 may have the storage areas 82, 84, 86, 88 and 90 of the second RAM 22. Another configuration is possible in which the ROM 18 is shifted between the normal operation mode and the self refresh mode. The ROM 18 may be in the normal operation mode in a case where the printer 10 is in the processing state 92, the standby state 94 or the L-sleeping state 96. The ROM 18 may be in the self refresh mode in a case where the printer 10 is in the D-sleeping mode 98. That is, the mode of the ROM 18 may be shifted in the same manner as the second RAM 22 of the embodiment. The CPU 14 and the CPU 24 may perform the processes by using the programs when the ROM 18 is in the normal operation state and has the programs stored therein.

(7) Although the present embodiment has described the printer 10, the technology disclosed in the present specification can be utilized in, for example, a server, a scanner, a multifunctional device, and a processing device other than the printer 10.

What is claimed is:

1. A processing device, comprising:
a first controlling unit configured to transit between a sleeping state and a non-sleeping state, and perform a specific process in a case where the first controlling unit is in the non-sleeping state;
a second controlling unit configured to perform the specific process on behalf of the first controlling unit in a case where the first controlling unit is in the sleeping state;
a first memory configured to store a first program; and
a second memory configured to store a second program, wherein the second memory is set to a normal operation mode in the case where the first controlling unit is in the non-sleeping state, and the second memory is set to a low power consumption mode in the case where the first controlling unit is in the sleeping state,
wherein, in the case where the first controlling unit is in the sleeping state, the second controlling unit is configured to:
(a) if the second controlling unit is to perform the specific process by using the first program, perform the specific process on behalf of the first controlling unit by using the first program stored in the first memory while the first controlling unit is maintained in the sleeping state and the second memory is maintained in the low power consumption mode, and
(b) if the second controlling unit is to perform the specific process by using the second program, change a mode of the second memory from the low power consumption mode to the normal operation mode, and perform the specific process on behalf of the first controlling unit by using the second program stored in the second memory, while the first controlling unit is maintained in the sleeping state.

2. The processing device as in claim 1, wherein
a total storage capacity of the second memory is larger than a total storage capacity of the first memory.

3. The processing device as in claim 1, wherein
if the second controlling unit is to perform the specific process by using the second program, the second controlling unit performs the specific process by using the second program stored in the second memory, without loading the second program into the first memory.

4. The processing device as in claim 1, wherein
if the second controlling unit is to perform the specific process by using the second program, the second control unit loads the second program stored in the second memory into the first memory, performs the specific process by using the second program stored in the first memory, and changes the mode of the second memory to the low power consumption mode.

5. The processing device as in claim 1, wherein
the second memory stores a first type of the second program and a second type of the second program, the first type of the second program being to be used in a state where the first type of the second program is stored in the first memory, and the second type of the second program being used in a state where the second type of the second program is stored in the second memory,
if the second controlling unit is to perform the specific process by using the first type of the second program, the second controlling unit is configured to:
load the first type of the second program stored in the second memory into the first memory;
perform the specific process by using the first type of the second program stored in first memory; and change the mode of the second memory to the low power consumption mode, and if the second controlling unit is to perform the specific process by using the second type of the second program, the second controlling unit is configured to perform the specific process by using the second type of the second program stored in the second memory, without loading the second type of the second program into the first memory.

6. The processing device as in claim 5, wherein
the second controlling unit deletes, when loading the first type of the second program into the first memory, a specific program stored in the first memory if the first memory is short of a storage area for storing the first type of the second program.

7. The processing device as in claim 6, wherein
the specific program is a program with the smallest number of use among a plurality of the first type of the second programs that have been stored in the first memory.

8. The processing device as in claim 7, wherein
the second controlling unit is configured to:
count a number of use for each of the plurality of the first type of the second programs, and
select a program with the smallest number of use among the plurality of the first type of the second programs as the specific program.

9. The processing device as in claim 1, wherein
in a case where the first controlling unit is in the sleeping state and the first controlling unit is to perform the specific process, the second controlling unit changes the mode of the second memory to the normal operation mode, and transits a state of the first control unit to the non-sleeping state.

10. The processing device as in claim 1, wherein
in a case where the second controlling unit has been unable to perform the specific process as a result of the second controlling unit having attempted to perform the specific process by using the second program, the second controlling unit changes the mode of the second memory to the normal operation mode, and transits a state of the first controlling unit to the non-sleeping state.

11. The processing device as in claim 1, wherein
the specific process includes a response process for responding to data received via a network,
the first program includes a first response process program corresponding to a first protocol, and
the second program includes a second response process program corresponding to a second protocol.

* * * * *